UNITED STATES PATENT OFFICE.

HARRY D. GIBBS, OF SAN FRANCISCO, CALIFORNIA, AND GEORGE A. GEIGER, OF WASHINGTON, DISTRICT OF COLUMBIA.

PROCESS FOR MANUFACTURING SIDE-CHAIN CHLORIN DERIVATIVES OF TOLUOL.

1,246,739. Specification of Letters Patent. Patented Nov. 13, 1917.

No Drawing. Application filed March 20, 1917. Serial No. 156,203.

(DEDICATED TO THE PUBLIC.)

*To all whom it may concern:*

Be it known that we, HARRY D. GIBBS and GEORGE A. GEIGER, citizens of the United States of America, and employees of the Department of Agriculture of the said United States, residing, respectively, in the city of San Francisco, county of San Francisco, State of California, and in the city of Washington, District of Columbia, (whose post-office address is Washington, D. C.,) have jointly invented a new and useful Process for Manufacturing Side-Chain Chlorin Derivatives of Toluol.

This application is made under the act of March 3, 1883, chapter 143 (22 Stat., 625), and the invention herein described and claimed may be used by the Government of the United States or any of its officers or employees in the prosecution of work for the Government, or any person in the United States, without payment to us of any royalty thereon.

Heretofore various methods have been employed for the production of derivatives of toluol containing chlorin substituted in the side chain, among which are the following:

1. By passing chlorin into boiling toluol in the presence of light until a certain weight of the chlorin is absorbed, a mixture of the different chlorin compounds is produced. The principal products are those in which the chlorin is substituted in the side chain but there are also present compounds containing chlorin in the ring.

2. On mixing gaseous toluol in excess and chlorin gas in the presence of light and a catalyst, only a portion of the toluol is attacked with the production of benzyl chlorid. The latter is mixed with unattacked toluol and the catalyst and must be subjected to a purification process which adds to the expense of the process.

3. By mixing gaseous toluol with an excess of chlorin gas in the presence of a catalyst a mixture of benzyl chlorid, benzal chlorid, benzotrichlorid, chlor-toluol, chlorbenzyl chlorid, etc., is produced. This action is somewhat analogous to 1, above mentioned, due to the fact that the reaction takes place in successive stages and yield of any one desired product can not be exactly controlled.

We have found that when the toluol, converted into the gaseous state, is mixed with chlorin gas in certain definite theoretical proportions in the presence of ultra violet rays, the desired products are produced in greatly increased yields and without the production of unfavorable, undesirable and interfering by-products.

For example:

1. When streams of gaseous chlorin and gaseous toluol are mixed in proportions agreeing with the following reaction:

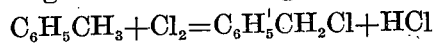

the principal products obtained are benzyl chlorid and gaseous hydrochloric acid.

2. When streams of gaseous chlorin and gaseous toluol are mixed in proportions agreeing with the following reactions:

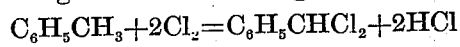

the principal products obtained are benzal chlorid (benzylidene chlorid), and gaseous hydrochloric acid.

3. When streams of gaseous chlorin and gaseous toluol are mixed in proportions agreeing with the following reactions:

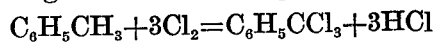

the principal products obtained are benzotrichlorid and gaseous hydrochloric acid.

It has been found possible to approach these ideal conditions by carefully regulating the speed at which the gaseous toluol and gaseous chlorin are simultaneously introduced into the reaction chamber.

Moreover, it is advisable to work without the presence of a catalyst, as we have found that it is not essential to the reaction and contaminates the product, thus adding to the expense of the process.

It is thus apparent that our invention introduces a decided improvement over those in use at the present time, inasmuch as we are able to produce certain particular derivatives of toluol containing chlorin in the side chain without the presence of large quantities of other derivatives containing more or less chlorin.

The procedure which we prefer for making benzyl chlorid is as follows:

The reaction chamber consisting of material resistant to all substances taking part in or produced by the reaction, is swept clear of air by the introduction of an inert gas, such as carbon dioxid. This reaction chamber is provided with a lamp such as the quartz mercury lamp, which emits ultra violet rays. The liquid toluol is then fed by means of a pump at the rate of 60 grams per minute into a vaporizer heated by a resistance coil which converts the toluol into the gaseous condition. The vapor is then led from the vaporizer into the reaction chamber. The chlorin is delivered from the cylinder or electrolytic cell through a measuring apparatus directly into the reaction chamber through a tube concentric with that of the toluol tube at the rate of 46 grams per minute. The product of the reaction collects on the bottom of the chamber and is drawn off at suitable intervals without the introduction of air. The hydrochloric acid formed is led off through the top of the chamber and absorbed in water.

For making benzal chlorid or benzotrichlorid the features outlined above are the same except that the rates of delivery of toluol and chlorin are different. If we wish to produce benzal chlorid the toluol is delivered at a rate of 60 grams per minute and the chlorin at 92.5 grams per minute. For benzotrichlorid the rates are, toluol 60 grams per minute, chlorin 139 grams per minute. It is understood that these rates can be increased or decreased in the same ratio depending on the capacity of the apparatus and measuring devices.

Having thus described our invention, we claim:

1. A process for producing certain definite chlorin derivatives of toluol by introducing gaseous toluol and gaseous chlorin in theoretical reacting proportions into a suitable reaction chamber in the presence of ultra violet rays.

2. A process for producing benzyl chlorid by introducing at a measured rate of speed one molecular equivalent of gaseous toluol and of one molecular equivalent of chlorin gas into a suitable reaction chamber in the presence of ultra violet rays.

3. A process for producing benzal chlorid by introducing at a measured rate of speed, gaseous toluol and gaseous chlorin in the theoretical proportions of one molecular equivalent of toluol and two molecular equivalents of chlorin in a suitable chamber in the presence of ultra violet rays.

4. A process for producing benzotrichlorid by introducing, at a measured rate of speed, gaseous toluol and chlorin in the theoretical proportions of one molecular equivalent of toluol and three molecular equivalents of chlorin in a suitable reaction chamber in the presence of ultra violet rays.

In testimony whereof, we affix our signatures in the presence of two subscribing witnesses.

HARRY D. GIBBS.
GEORGE A. GEIGER.

Witnesses:
JOSEPH A. AMBLER,
LAURA A. SKINNER.